Oct. 14, 1958   D. D. HOAGG ET AL   2,856,020
AUTOMOBILE EXHAUST MEANS
Filed Dec. 31, 1953
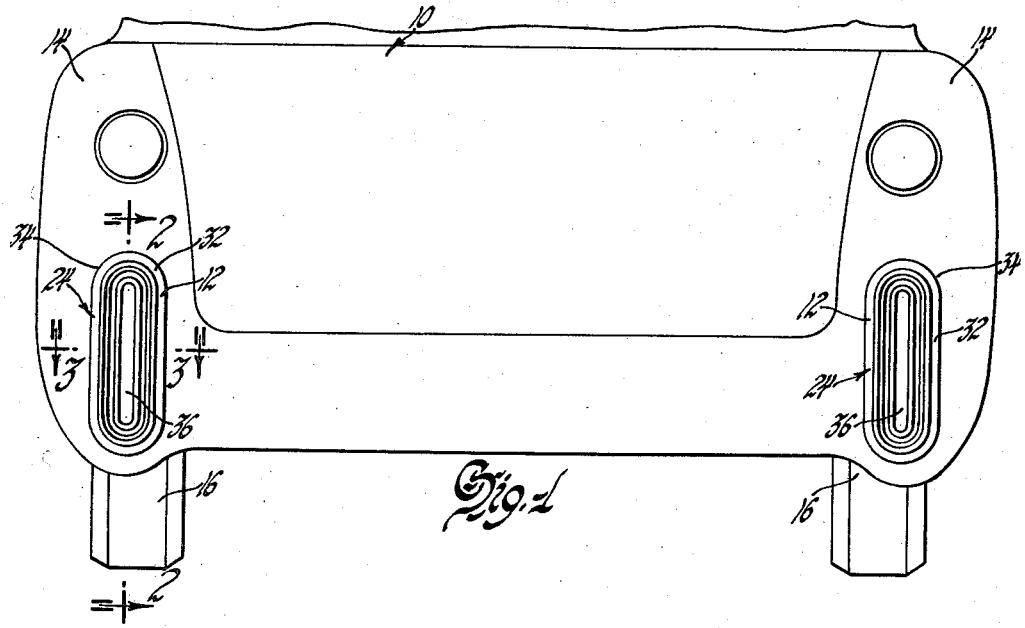
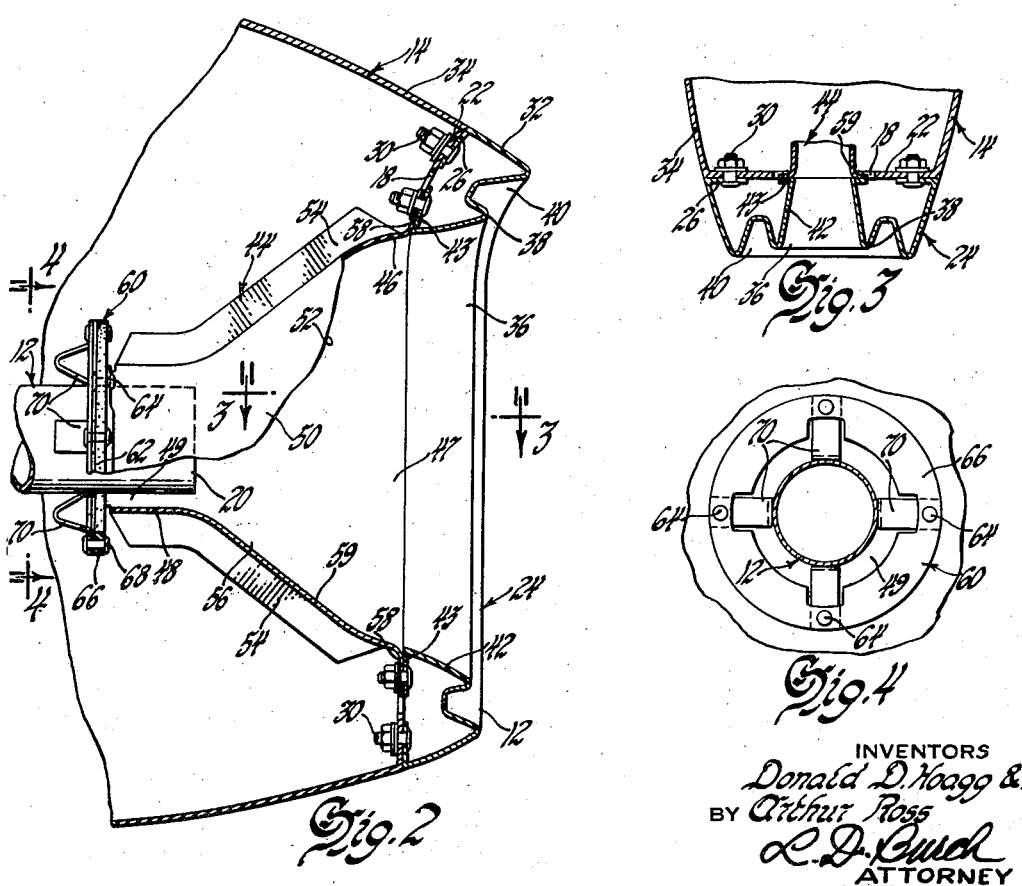
INVENTORS
Donald D. Hoagg &
BY Arthur Ross
L. D. Busch
ATTORNEY

United States Patent Office 2,856,020
Patented Oct. 14, 1958

2,856,020

AUTOMOBILE EXHAUST MEANS

Donald D. Hoagg, Birmingham, and Arthur Ross, Detroit, Mich., assignors to General Motors Corporation, Detroit, Mich., a corporation of Delaware Application December 31, 1953, Serial No. 401,449

4 Claims. (Cl. 180—64)

The present invention relates to exhaust apparatus for motor vehicles and more particularly to means for discharging the engine exhaust gases from the rear portion of the vehicle.

To prevent exhaust gases from an automotive engine entering the passenger compartment of a vehicle, it is the present practice to discharge the exhaust gases from the rear of the vehicle. This may be accomplished by means of one or more exhaust conduits that extend from the engine to the rear portion of the vehicle. To reduce the possibility of the gases discharged from the exhaust conduit rising through the floor of the vehicle into the passenger compartment, it is desirable that the end of the exhaust conduit discharge the gases behind the rear of the vehicle. This normally results in the end of the exhaust conduit extending below and beyond the rear bumper. This results in the exhaust conduit being disposed so low that it is frequently damaged by striking obstructions in the road. Although numerous attempts have been made to raise the exhaust system by positioning the discharge end thereof so as to discharge the exhaust gases through a portion of the vehicle body, they have generally proved to be impractical since the engine vibrations present in the exhaust system are frequently transferred to the vehicle body and cause objectionable noises in the passenger compartment.

Accordingly, it is proposed to provide sound absorbent exhaust discharge means which permit the exhaust gases to be discharged from one or more apertures in the rear portions of the vehicle body. This will permit the exhaust system to be mounted high enough to reduce damage thereto and to reduce the transmission of objectionable engine noises into the passenger compartment.

It has also been found that the exhaust gases have a corrosive effect on the vehicle body which results in local discoloration and/or deterioration. Accordingly, it is also proposed to provide means for allowing fresh air to assist in separating the hot exhaust gases from the body.

In the drawing:

Fig. 1 is a fragmentary view of the rear portion of a vehicle embodying the present invention.

Fig. 2 is a vertical cross sectional view taken substantially along the plane of line 2—2 in Fig. 1.

Fig. 3 is an end view of the exhaust means taken substantially along the plane of lines 3—3 in Figs. 1 and 2.

Fig. 4 is a cross sectional view taken substantially along the plane of line 4—4 in Fig. 2.

Referring to the drawing in more detail, the present invention may be embodied in any vehicle 10 having one or more engine exhaust conduits 12 that terminate in the rear portion of the vehicle 10. In the present instance a conduit 12 is disposed inside of rear fenders 14 that are disposed on each side of the vehicle 10 covering the rear ground wheels 16. However, it should be understood the conduit 12 may be disposed adjacent any body member such as a bumper or a body panel.

Either one or both of the fenders 14 may be provided with an aperture 18 for positioning the exhaust discharge means. These apertures 18 are preferably positioned in the rear portions of the fender 14 so as to be disposed adjacent the discharge end 20 of the exhaust conduit 12. Although the apertures 18 may be of any desired shape, in the present instance the aperture is substantially elliptical with the major axis thereof extending substantially parallel to the plane of the fender 14. The fender 14 may have the edge thereof formed at right angles so as to form a mounting flange 22 that extends around the periphery of the aperture 18.

A decorative member such as the ring 24 may be provided with an inwardly directed flange 26 that is adapted to seat on the fender mounting flange 22. This will permit the ring 24 being easily secured to the fender 14 by any suitable means such as bolts 30. This ring 24 may have substantially the same elliptical shape as the aperture 18 so that the exterior surface 32 thereof will form a fair continuation of the fender surface 34. The ring 24 may have a passage 36 provided through the center thereof so as to communicate with the space formed in the interior of the fender 14. The cross section of this passage 36 may be similar to the exterior of the ring 24 so as to form an opening that will cause the face 38 of the ring to be of substantially uniform width at all portions. If desired a decorative configuration such as a recessed groove 40 may be provided in the face 38 of the ring 24. This passage 36 preferably has a smooth surface 42 that tapers inwardly towards the discharge end 20 of the exhaust conduit 12 which is located inside of the fender 14. The inside of the ring 24 may be provided with mounting means such as a flange 43 that extends around the inner end of the passage 36.

In order to direct the flow of exhaust gases from the exhaust conduit 12 to the passage 36 in the ring 24 a support member 44 may be secured thereto. In the present instance this support is a hollow member 44 that has a large end 46 with an elliptical opening 47 similar to that of the inner end of the passage 36 and a small end 48 with an opening 49 similar to the shape of the discharge end 20 of the exhaust conduit 12. This support member 44 may be fabricated in any suitable manner. In the present instance a pair of identical sheet metal stampings 50 are provided with dished center portions 52 and flanges 54 on the opposite edges thereof. When the flanges 54 are secured together the dished portions 52 will form a transitional passage 56 that tapers inwardly to connect the larger opening with the smaller opening. The stamped members 50 may have the larger end formed with a flange 58 that cooperates with the flange 43 on the ring 24. Thus the support member 44 may be secured to the ring 24 so that the larger opening 47 will register with the opening in the ring 24. The inner surface 59 of the support member 44 and the inner surface 42 of the ring 24 may be formed to cooperate with each other to form a streamlined passage having a continuous and fair surface that communicates between the end 20 of the exhaust conduit 12 and the face 38 of the ring 24.

The small end 48 of the support member 44 is adapted to have the discharge end 20 of an exhaust conduit 12, such as a tailpipe, extend into the passage 56 in spaced relation to the support member 44. The conduit 12 may terminate in any portion of the passage 56 so that the exhaust gases will flow out through the ring 24. Although the exhaust conduit 12 may be supported in any suitable manner, it has been found convenient to employ a mounting 60 on the small end 48 of the support member 44 for resiliently supporting the discharge end 20 by means of the support member 44. In order to reduce or eliminate the transmission of engine vibrations from the exhaust conduit 12 through the support member 44 into the body, it is desirable that the exhaust conduit 12 be acoustically isolated from the body.

Accordingly, it has been found advantageous to employ a sound deadening mounting 60 on the small end 48 of the support member 44 for resiliently carrying the discharge end 20 of the exhaust conduit 12. This support includes an annulus 62 of resilient sound absorbent material such as a rubber tire carcass which is secured to the support member 44 by a set of spaced rivets 64. A rigid ring 66 may be secured to the annulus 62 by a second set of rivets 68 that are spaced from the first set of rivets 64. A plurality of spring clips 70 may be formed integral with the ring 66 so that they will be carried by this annulus 62 of sound absorbent material. These spring clips 70 which may be bowed to increase the resilience thereof are positioned to frictionally engage the discharge end 20 of the conduit 12 and resiliently support the conduit 12 in the small end of the support member 44. Since the clips 70 slidably engage the exterior of the conduit 12, the conduit 12 is free to move axially relative to the support 44 as a result of either thermal expansion or contraction. In addition these spring clips 70 will permit lateral movement of the exhaust conduit 12 resulting from causes such as distortions of the body etc.

In the event there are any engine vibrations present in the exhaust system they will be partly absorbed by the spring clips 70 and partly by the sound absorbent material 62. It is thus apparent that a novel exhaust mounting has been provided which will permit the exhaust gases to be discharged through the vehicle body without causing objectionable noises in the passenger compartment.

Various changes and modifications of the embodiment of the invention described herein may be made by those skilled in the art without departing from the spirit and principles of the invention.

What is claimed is:

1. In a motor vehicle having a body member with an aperture therethrough and an exhaust pipe for said motor terminating adjacent said aperture, a ring-like bezel having an exterior surface with a radially outer portion and a radially inner portion, mounting means on said bezel secured to said body member to retain said bezel in position, a tubular support member having one end thereof secured to said bezel adjacent said inner portion to form a passage extending through said bezel and said member and opening into the atmosphere, the opposite end of said support member telescoped over the terminal end of said exhaust pipe and including insulating means for supporting said terminal end for discharging exhaust gases through said passage.

2. In a motor vehicle having a body member with an aperture therethrough and an exhaust pipe for said motor terminating adjacent said aperture, a flange on said member extending circumferentially around said aperture and projecting radially inwardly towards the center thereof, a ring-like bezel having an exterior surface with a radially outer portion and a radially inner portion, a first flange on said bezel secured to the flange on said body member to retain said bezel in position, the surface of said radially outer portion forming a smooth continuation of the surface of said body member, a tubular support member having an exhaust passage therethrough and a flange on one end thereof and insulating means on the opposite end thereof supporting the terminal end of said exhaust pipe in alignment with said exhaust passage, a second flange on said bezel adjacent said inner portion secured to said flange on said support member to retain said support member in position, the surface of said radially inner portion forming a smooth continuation of said exhaust passage, said flanges mating with each other to prevent the circulation of air therebetween.

3. A ring-like bezel secured to a vehicle body member having an aperture therethrough and forming a terminal outlet for an exhaust system for said vehicle, said bezel having an exterior surface with an outer portion and an inner portion, fastening means on said bezel adjacent said outer portion secured to said body member with said outer portion forming a smooth continuation of said body member and means on said bezel adjacent said inner portion secured to a tubular exhaust member with said inner portion forming a smooth continuation of a passage through said tubular exhaust member.

4. Exhaust means secured to a vehicle body member having an aperture therethrough comprising a ring-like bezel having an exterior surface with a radially outer portion disposed in said aperture and a radially inner portion, fastening means on said bezel adjacent said outer portion secured to said body member so that the surface of said outer portion will form a smooth continuation of said body member, a tubular support member, fastening means on said bezel adjacent said inner portion secured to one end of said tubular support member so that the surface of said inner portion will form a smooth continuation of a passage through said support member, the opposite end of said support member including insulating means receiving the discharge end of an exhaust pipe from said vehicle, said first fastening means preventing the circulation of air between said body member and said bezel.

References Cited in the file of this patent

UNITED STATES PATENTS

| | | |
|---|---|---|
| 2,288,172 | Ulrich | June 30, 1942 |
| 2,308,969 | Riesing | Jan. 19, 1943 |
| 2,324,992 | Riesing | July 20, 1943 |
| 2,515,391 | Arbib | July 18, 1950 |
| 2,654,253 | Ford | Oct. 6, 1953 |

FOREIGN PATENTS

| | | |
|---|---|---|
| 793,684 | France | Nov. 23, 1935 |
| 419,944 | Italy | Apr. 14, 1947 |